United States Patent [19]

Walker

[11] Patent Number: 5,286,768
[45] Date of Patent: Feb. 15, 1994

[54] AQUEOUS COATINGS COMPOSITION CONTIANING CELLULOSE MIXED ESTER AND AMINE NEUTRALIZED ACRYLIC RESIN AND THE PROCESS FOR THE PREPARATION THEREOF

[75] Inventor: Kenneth R. Walker, Wigan, England

[73] Assignee: Eastman Kodak Company, Rochester, N.Y.

[21] Appl. No.: 854,501

[22] Filed: Mar. 18, 1992

[51] Int. Cl.$^5$ .................... C08L 1/14; C08L 33/02
[52] U.S. Cl. .............................. 524/40; 524/38; 524/39
[58] Field of Search ............... 524/37, 38, 39, 40, 524/41

[56] References Cited

U.S. PATENT DOCUMENTS

| | | |
|---|---|---|
| 3,318,714 | 5/1965 | Coney et al. . |
| 3,320,865 | 11/1967 | Coney et al. . |
| 4,136,068 | 1/1979 | Nomura et al. ................. 524/37 |
| 4,252,697 | 2/1981 | Hashizume et al. . |
| 4,435,531 | 3/1984 | Nakayama et al. . |
| 4,532,177 | 7/1985 | Mashar . |
| 4,590,265 | 5/1986 | Bogan et al. . |
| 4,960,814 | 10/1990 | Wu et al. . |

FOREIGN PATENT DOCUMENTS 0195172 10/1988 Japan ................................. 524/41

OTHER PUBLICATIONS

World Surface Coatings Abstracts 1984, Oxford GB, p. 1422, Savastenko et al. 'light sensitivity of layers containing acidic mixed acetic esters of cellulose and polyvinyl alcohol'.

Primary Examiner—Paul R. Michl
Assistant Examiner—Peter Szekely
Attorney, Agent, or Firm—Mark A. Montgomery; William P. Heath, Jr.

[57] ABSTRACT

An aqueous coating composition is provided containing up to 50 weight percent, based on the total solids, of a cellulose mixed ester and a compatible amine neutralized acrylic resin.

16 Claims, No Drawings

AQUEOUS COATINGS COMPOSITION CONTIANING CELLULOSE MIXED ESTER AND AMINE NEUTRALIZED ACRYLIC RESIN AND THE PROCESS FOR THE PREPARATION THEREOF

FIELD OF THE INVENTION

The present invention relates to novel aqueous coating compositions containing cellulose mixed esters and acrylic resins and to the process for the preparation thereof. More particularly the present invention relates to aqueous coating compositions containing succinated derivatives of cellulose esters and a compatible amine neutralized acrylic resin.

BACKGROUND OF THE INVENTION

Cellulose esters are valuable polymers which are useful in many plastic, film, coating and fiber applications. In coatings applications, cellulose esters are generally applied from organic solvent solutions. Because of health and environmental concerns from volatile organic content of solvent based coatings, water based coatings are becoming more in demand. There are waterborne coating formulation available containing polyesters and acrylics, but few contain cellulose esters due to their hydrophobic nature making them difficult to disperse or emulsify. When applied from organic solvent solutions as wood, leather, and metal coatings, cellulose esters impart desired properties such as, improved pigment dispersions, improved metallic flake orientation, improved solvent release, and higher gloss coatings. Cellulose esters also function as an excellent rheology control agent in solvent coating formulations. It would be very desirable to incorporate these excellent properties of cellulose esters into waterborne coating systems.

Previous attempts to produce a water dispersible cellulose ester coatings system have involved oxidation of cellulose ester, grafting of acrylic acid to cellulose esters, and reaction of anhydrides such as phthalic anhydride or succinic anhydride with the hydrolyzed cellulose esters to provide modified cellulose esters containing free carboxyl groups such as disclosed in the following U.S. patents; U.S. Pat. Nos. 4,435,531; 4,590,265; 4,960,814; 4,252,697. The reaction of anhydrides with cellulose esters results in a cellulose mixed ester. Coatings prepared from these cellulose mixed esters are made by neutralizing the cellulose mixed ester with an amine and forming an aqueous dispersion. Coating compositions made from these dispersions are not always stable and have volatile organics content (VOC) above 20 weight percent.

Other cellulose ester systems used in water based coating are disclosed in U.S. Pat. No. 3,318,714 (describing pigment dispersions in a cellulose acetate butyrate lacquer systems) and U.S. Pat. No. 3,220,865 (describing an emulsion coating composition based on cellulose acetate butyrate, and plasticizers).

In light of the above it would, be very desirable to be able to produce stable aqueous dispersions that are low in VOC.

SUMMARY OF THE INVENTION

The aqueous coating composition of the present invention comprises:
(a) an amount up to 50 weight percent based on total solids, of at least one cellulose mixed ester, having an acid number of at least 50 and having a first ester residue, that is a residue of a of a dicarboxylic acid anhydride, and a second ester residue that is selected from the group consisting of oleophilic monocarboxylic acid residue, hydrophilic monocarboxylic acid residue and mixtures thereof
(b) at least 50 weight percent based on total solids of a compatible amine neutralized acrylic resin;

wherein the aqueous coating composition has a near neutral pH and a VOC below 20 weight percent based on the total of solids and liquid.

A further aspect of the present invention entails a process of producing a composition by mixing in a high shear mixture (a) and (b) above to form a composition having a near neutral pH and a volatile organics content below 20 weight percent.

DETAILED DESCRIPTION OF THE INVENTION

The applicant has unexpectedly discovered novel aqueous coating compositions containing cellulose mixed esters and compatible amine neutralized acrylic resins that are relatively stable over long periods of time. Additionally, the applicant has discovered that these aqueous coating compositions containing cellulose mixed esters and acrylic resins provide excellent coatings for many substrates such as metal, wood, and plastics, particularly metals when the coating contains metal flake pigment.

The aqueous coating composition of the present invention are prepared by directly mixing the cellulose mixed ester and the compatible amine neutralized acrylic resin without the need of forming an aqueous dispersion of the cellulose mixed esters and without the need of the amine neutralizing step since sufficient amine is provided by the neutralized acrylic resin.

By avoiding the amine neutralization step the resulting composition has a near neutral pH (preferably about neutral) and the individual components are more compatible. Also by avoiding this step it is believed to result in an aqueous coating composition with very low VOC.

The aqueous coating composition of the present invention provides a coating that drys faster and has a very good metallic appearance. The aqueous coating composition results in a coating with good metallic flop. In other words the face angle brightness is high and the low angle brightness is low.

The aqueous compositions of the present invention generally have 3 to 50 weight percent cellulose mixed ester, based on the total solids. The amount of cellulose mixed ester is preferably about 5 to 40 weight percent more preferably 10 to 30 weight percent with an amount of about 10 to 25 weight percent being most preferred. An adequate amount of cellulose mixed ester is required to result in a dispersion that has good stability and good film forming ability. Adequate amounts of cellulose mixed ester also increase the drying characteristics and improve the gloss of the final coating. Thus amounts of cellulose mixed ester below about 3 weight percent based on total solids do not significantly improve the quality of the dispersion whereas amounts much over 50 weight percent based on the total solids reduce the amount of acrylic resin present lowering the strength and hardness of the resulting dried and/or cured coating. Although amounts of cellulose mixed ester much above 25 weight percent up to 50 weight percent do not reduce the quality of the resulting coating, little improvement is observed.

The cellulose ester of the present invention is a cellulose mixed ester that has at least two different ester functionalities thereon. The ester functionalities are herein referred to as a first ester residue and a second ester residue. The term ester residue, refers to those portions of the mixed ester which are added as a result of the reaction of a carboxylic functionality (located on a reactant) with a hydroxyl functionality which is located on the cellulose molecule. The result of this reaction is the esterification of the cellulose molecule, with the ester being that portion of the reactant which resides on the cellulose ester.

The first ester residue is a ester residue of an anhydride of a dicarboxylic acid. The anhydride can be a dicarboxylic acid anhydride, or an oligomer or polymer containing the anhydride of at least one such dicarboxylic acid. The first ester residue is linked to the cellulose molecule with an ester functionality, and the first ester residue further comprises a carboxylic acid functionality. This carboxylic acid functionality allows the resulting mixed ester to be associated with a basifying agent such as an amine and then used in a waterborne coating formulation without further modification of the cellulose mixed ester. The cellulose ester used in a waterborne coating is associate with other elements in the coating particularly an acrylic polymer to impart the desired rheological properties. One such desired rheological property for a coating which contains metal flake pigment(s) results in an improvement in the parallel alignment of the metal flakes in the applied coating i.e. good metallic flop. Cellulose esters which do not have such a first ester residue do not impart the desired rheological properties to waterborne coating formulations.

The first ester residue can be formed, in general, from the reaction of any anhydride of a dicarboxylic acid with cellulose. Examples of useful anhydrides are succinic anhydride including its derivatives such as methylsuccinic anhydride, dodecenylsuccinic anhydride, and octadecenylsuccinic anhydride; phthalic anhydride including its derivatives such as tetrahydrophthalic anhydride, methyltetrahydrophthalic anhydride, hexahydrophthalic anhydride, alkylhexahydrophthalic anhydrides such as methylhexahydroph-thalic anhydride, endomethylene tetrahydrophthalic anhydride, and 3-nitrophthalic anhydride; maleic anhydride including its derivatives such as citraconic anhydride; glutaric anhydride; adipic anhydride; itaconic anhydride; 5-norborene-2,3-dicaroxylic anhydride including its derivatives such as chlorendic anhydride; and diglycolic acid anhydride. Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, and 1,3,4-cyclopentane tricarboxylic anhydride. Additionally, any oligomeric or polymeric compounds which comprise anhydrides of dicarboxylic acids could be used. However, preferred anhydrides of dicarboxylic acids comprise one or more members selected from the group consisting of: succinic anhydride, trimellitic anhydride, glutaric anhydride, adipic anhydride, itaconic anhydride, phthalic anhydride, hexahydrophthalic anhydride, and diglycolic acid anhydride. Still more preferred anhydrides of dicarboxylic acids comprise one or more members selected from the group consisting of: succinic anhydride, glutaric anhydride, adipic anhydride, phthalic anhydride, hexahydrophthalic anhydride, and diglycolic acid anhydride. The most preferred anhydride of a dicarboxylic acid is succinic anhydride.

In general, the first ester residue makes up from about 3 weight percent to about 35 weight percent of the mixed cellulose ester. These weight percent values are based on the weight of the mixed ester. Preferably the first ester residue is present in an amount of from about 3 weight percent to about 17 weight percent, based on the weight of the mixed ester. Still more preferably, the first ester residue is present in an amount of from about 8 weight percent to about 17 weight percent, based on the weight of the mixed ester. The most preferable amount of first ester residue present in the mixed ester depends upon the particular coating composition which is being formulated, because it affects the interactions of the mixed cellulose ester with the other components as well as the stability of the mixed cellulose ester in the particular dispersion.

The second ester residue is a residue of an oleophilic monocarboxylic acid and/or a hydrophilic monocarboxylic acid. As with the first ester residue, the second residue is linked to the cellulose molecule with an ester functionality. However, in contrast to the first ester residue, the second ester residue does not further comprise a carboxylic acid functionality. The presence of the second residue on the mixed ester has the effect of promoting interactions with other components in the coating composition, particularly with any other polymer(s) present, to effect desirable rheological characteristics. In this regard, its function is similar to that of the first ester residue. However, the oleophilic and hydrophilic properties of the second ester residue may be changed and balanced to suit a particular coating composition. Because of the nature of the first residue, it contributes strongly to the hydrophilicity of the mixed cellulose ester.

The second ester residue can be formed, in general, from the reaction of any oleophilic monocarboxylic acid and/or any hydrophilic monocarboxylic acid, with cellulose. In general, the second ester residue makes up from about 1 weight percent to about 95 weight percent, based on the weight of the mixed cellulose ester. However, residues of oleophilic monocarboxylic acids, if present, should in general be present in an amount of from about 10 weight percent to about 65 weight percent, based on the weight of the mixed ester. Furthermore, residues of hydrophilic monocarboxylic acids, if present, should in general be in an amount of from about 1 weight percent to about 45 weight percent based on the weight of the mixed ester.

Preferred oleophilic monocarboxylic acids comprise at least one member selected from the group consisting of monocarboxylic acids having at least 3 carbon atoms therein (as well as derivatives of such monocarboxylic acids). Still more preferred oleophilic monocarboxylic acids comprises at least one member selected from the group consisting of: butyric acid, propionic acid, valeric acid, hexanoic acid, and other aliphatic monocarboxylic acids. The selection of the most preferred oleophilic monocarboxylic acid depends upon the particular formulation being produced because of its contribution to the interactions which bring about the rheological properties desired in the coating. Among the most preferred oleophilic monocarboxylic acids are propionic acid and butyric acid.

The amount of oleophilic monocarboxylic acid residue present in the mixed ester is, as stated above, generally from about 10 weight percent to about 65 weight percent, based on the weight of the mixed ester. Preferably, the amount of oleophilic monocarboxylic acid residue present is from about 30 weight percent to about 55 weight percent. Still more preferably, the amount of oleophilic monocarboxylic acid residue is from about 30 weight percent to about 46 weight percent. The selection of the most preferred amount of oleophilic monocarboxylic acid residue present depends upon the particular coating formulation being produced, the particular oleophilic monocarboxylic acid chosen, and the types and amounts of the other residues on the mixed cellulose ester.

Preferably, the hydrophilic monocarboxylic acid residue comprises one or more members selected from the group consisting of: acetic acid residues and residues that are derivatives of acetic acid. The selection of the most preferred hydrophilic monocarboxylic acid depends likewise upon the particular formulation being produced, the amount of hydrophilic monocarboxylic acid used, and the types and amounts of the other residues on the mixed cellulose ester. Most preferably, the hydrophilic monocarboxylic acid residue is acetic acid residue.

The amount of hydrophilic monocarboxylic acid residue present in the mixed ester is, as stated above, generally from about 0.5 weight percent to about 45 weight percent, based on the weight of the mixed ester. Preferably, the amount of hydrophilic monocarboxylic acid residue present is from about 1 weight percent to about 15 weight percent. The selection of the most preferred amount of hydrophilic monocarboxylic acid residue present depends upon the particular coating formulation being produced, the particular hydrophilic monocarboxylic acid chosen, and the types and amounts of the other residues on the mixed cellulose ester.

The cellulose mixed ester used in the present invention has an acid number of at least 50, determined by the milligrams of KOH required to neutralize one gram of resin. The acid number is preferably high and can be as high as 105 to 110. However, the acid number of the cellulose mixed ester is preferably greater than 55 more preferably between about 60 to 65.

In general, the cellulose mixed ester of the present invention can be further characterized as having a number average molecular weight of from about 5,000 to about 100,000, as determined by standard methods of gel permeation chromatography as measured against polystyrene standards. Preferably, the number average molecular weight is from about 10,000 to about 100,000. Most preferably, the number average molecular weight is about 10,000 to about 30,000.

In general, the cellulose mixed ester of the present invention can be further characterized as having a degree of substitution of from about 2 to about 3. Preferably, the degree of substitution is from about 2.2 to about 3. Most preferably, the degree of substitution is about 2.5 to about 3.

In general, the cellulose mixed ester of the present invention is neutralized partially or fully with a basifying agent that is present with the acrylic polymer. The basifying agent is preferable an amine. The amine employed is preferably one which will be volatilized during the curing of the coating and will not remain in the cured coating. One preferred amine is ammonia.

The coating composition of the present invention is a coating composition which comprises the cellulose mixed ester of the present invention and an acrylic polymer component. In addition to the cellulose mixed ester as a rheology control agent, the coating composition preferably further comprises materials chosen from the group consisting of other polymers, crosslinkers, water, organic solvents, basifying agents, flake pigments, other pigments, and additives.

The preparation of cellulose mixed esters are known (C. J. Malm, G. D. Hiatt in E. ott, H. M. Spurlin, and M. W. Graffin, Ed., cellulose derivatives, Part II, 2nd Edition Interscience, New York, 1954, pp. 763-824). A typical procedure for the preparation of a cellulose ester (e.g. a cellulose acetate butyrate) can be found in U.S. Pat. No. 4,532,177. The disclosure of which is incorporated herein by reference. Note in particular column 5, line 30 through 6, line 4.

Examples of suitable cellulose esters include cellulose acetate butyrate (CAB), cellulose acetate propionate (CAP), cellulose acetate valerate (CAV), cellulose acetate isovalerate (CAIV), cellulose acetate propionate butyrate (CAPB), and the like, with CAP and CAB being more preferred and CAB being most preferred.

The preferred cellulose mixed esters are the succinated derivatives of cellulose esters. Thus the most preferred cellulose mixed ester is CAB succinate. The most preferred example of CAB succinate used in the present invention is CAB-SU160 available from Eastman Chemical Company of Kingsport, Tenn. These succinate-substituted CAB's are produced by reacting a cellulose acetate butyrate having a hydroxyl functionality with succinic anhydride. Reactions between hydroxyl groups and acid anhydrides, such as this reaction, can typically be carried out under mild conditions (i.e. room temperature to 150° C. and atmospheric pressure). CAB-SU160 typically has a butyryl content of 41.6 weight percent, and acetyl content of 1.2 weight percent, a hydroxyl content of 3 weight percent, a degree of succination of 11.5 weight percent, an acid number of 60, a free acid weight percent of less than 0.1, and molecular weight Mn of 20,000.

The aqueous coating composition of the present invention has an acrylic polymer or resin component content of at least 50 weight percent based on the total weight of solids. The amount of this acrylic resin component is preferably about 60 to 95 weight percent preferably 70 to 90 weight percent with an amount of about 75 weight percent being most preferred. This acrylic resin component contains a compatible amine neutralized acrylic resin which can have a minor amount of a polyurethane such that the aqueous coating composition has no more than about 20 weight percent polyurethane, based on total solids, preferably less than 15 weight percent. The resulting aqueous composition has at least a minor amount of polyurethane so that the resulting coating is not too stiff or brittle but not so much as to interfere with the qualities of the cellulose mixed ester. The amount of polyurethane is more preferably about 5 to 15 weight percent based on total solids.

A compatible acrylic resin is one that remains dispersed with the cellulose mixed ester when the composition is stored. Suitable examples of acrylic resins that are useful in the present invention are copolymers containing acrylic acid, methacrylic acid, hydroxyethylmethacrylate, and the like, including vinyl monomers thereof. The acrylic resins used in the dispersion composition of the present invention have free acid functionalities. However, these free acid functionalities are at least partially neutralized prior to forming the final dispersion composition. The acrylic resins are partially neutralized to be able to form ionic dispersions in the resulting dispersion composition. Acrylic resins preferably have an acid number prior to partial neutralization of about 10 to 80, more preferably about 40 to 60 with an acid number of about 50 to 60 being the most preferred. The acrylic resins are preferably neutralized by 5 to 100%, preferably 10 to 80% with a neutralization percent of about 10 to 30 being most preferred. The acrylic resins are preferably neutralized using amines including ammonia. Suitable amines include ammonia, diethylaminoethanol, dimethylaminoethanol, N,N-dimethylethylamine, 2-dimethylamino-2-methyl-1-propanol, triethylamine, and the like, with ammonia being most preferred due to availability and effectiveness. The amine neutralized acrylic resin is preferably non acidic prior to being combined and mixed with the cellulose mixed ester. The amine neutralized acrylic resin preferably has a pH in solution of 7.5 to 8.5.

A surfactant is not required by the present invention and cross-linking is optional.

The water content in the dispersion of the present invention depends upon the desired viscosity of the dispersion. The amount of water is the amount of water sufficient to render the dispersion usable in the particular coating application.

The overall total solids content of the aqueous coating composition of the present invention including cellulose mixed ester and acrylic resin is about 5 to 50 weight percent. The overall solids content, based on the total dispersion, is preferably about 10 to 40 weight percent more preferably 20 to 40, with an overall total solids content of about 25 to 35 weight percent being most preferred.

The VOC of the aqueous coating composition of the present invention is very low, below about 20 weight percent, preferably below 15 weight percent, more preferably below 10 weight percent, with a VOC near zero being most preferred. Thus the amount of organic solvent and any cosolvent used in the organic coating composition of the present invention is below about 20 weight percent, preferably below about 15 weight percent. Examples of suitable organic solvents include cyclohexanone, methylethylketone, acetone, methylamylketone, ethylacetate, propylacetate, butylacetate, ethylene glycol monobutylether, ethylene glycol monopropylether, ethylene glycol monoethylether, propylene glycol monomethylether, xylene, ethyl-3-ethoxypropionate, and alcohols such as 2-propanol, 2-butanol, and 2-methyl-1-propanol and the like. The slower drying solvents are more preferred in that they produce a better final coating. The most preferred slower drying solvent is 2-butanol, particularly for pigmented coatings.

Other materials including conventional additives can be added to the dispersion of the present invention by conventional methods. Suitable examples of additives include polymer thermal stabilizers, UV stabilizers, antioxidants, colorants, carbon black, metal flake (including aluminum flake), and pigments. Preferred pigments include titanium dioxide, chromium oxide, chromium yellow, and cadmium red. The amount of pigments and additives depends upon each particular end-use application.

Common thermal stabilizers include epoxide-containing compounds such as glycidyl ether of aromatic hydrocarbons and, alcohols, for example, EPON 828, a Bisphenol-A type epoxy compound produced by Shell Chemical Company. Other suitable epoxide-containing compounds include epoxidized soybean oil or epoxidized tallate. Antioxidants generally used in the dispersion composition of the present invention include hindered phenol-type compounds, for example, 4-methyl-2,6-di-tert-butylphenol and tetrakis[methylene(3,5-di-tert-butyl-4-hydroxyhydrocinnamate)]methane (Irganox 1010 by Ciba-Geigy Corporation). Other compounds such as Tinuvin 770, a hindered amine, are also effective as antioxidants.

Ultraviolet stabilizers commonly used include 2,-(2'-hydroxyphenyl)benzotriazoles and 2-hydroxybenzophenones.

The aqueous coating composition of the present invention is preferably a pigmented composition containing up to 30 parts pigment per 100 parts resin (a plus b). The amount of pigment is preferably up to 20 parts per 100 parts, more preferably 5 to 15 parts per 100, with about 10 to 15 parts per 100 parts resin being most preferred. At least a portion of the pigment up to 100% of the pigment is a metal flake. Metal flake flop is greatly enhanced by the present invention thus a significant amount of metal flake in the aqueous coating composition is preferred. Aluminum flake is the most preferred metal flake.

The aqueous coating composition of the present invention is a dispersion and is preferably prepared at a temperature of about 25° to 60° C., more preferably about 25° to 60° C., with a temperature of about 50° C. being most preferred due to the solubility of the cellulose mixed ester in the preferred solvent 2-butanol. The higher the temperature, the faster the dispersion will be formed, however, temperatures much above 100° C. are not very practical and the higher temperatures are above the boiling points of preferred solvents. The dispersion preparation time or mixing time is generally between a few seconds and 30 minutes, with a time between about 1 and 10 minutes being most preferred. Times shorter than a few seconds are possible but are limited by the speed of adding the cellulose mixed ester composition to the acrylic resin composition whereas times longer than 30 minutes do not significantly increase the homogeneity of the dispersion.

The dispersions according to the present invention are generally low viscosity and milky in appearance. When coated on wood, metal, leather, and the like, they have good adhesion and dry to form clear, transparent films with good appearance and hardness.

The dispersion of the present invention can be applied to any suitable substrate by standard methods such as spraying, rolling, and brushing. Among the more useful substrates are metal, wood, leather, plastics, paper, fabrics, and glass.

After the aqueous dispersion of the present invention is applied to a suitable substrate, it is solidified by evaporation of the liquid component or other solidification methods known in the art of coatings and film forming. After solidification the coating can then be cured at elevated temperatures. The curing or drying temperature can vary depending upon the application.

EXAMPLES

The following examples are to illustrate the present invention but are not intended to limit the reasonable scope thereof.

PREPARATION OF WATER BASED PAINTS USING SUCCINYLATED C.A.B.

EXAMPLE 1

40 g of CABSU160 was dissolved at 40% solids in 2-butanol using a 'Silverson' High Shear mixer. The solution was effected by slowly pouring the powered CABSU160 into the rapidly stirred solvent over a period of 1 or 2 minutes. The energy imparted by the mixer caused the temperature to rise and allowed more rapid solution to be obtained. The final temperature of the 40% solids solution was about 50° C.

Neocryl XK62 resin (42% solids acrylic emulsion from ICI Resins) was then slowly poured into the rapidly stirred CABSU160 solution. The viscosity increase caused by the addition of the Neocryl XK62 resin was controlled by adding deionized water intermittently with the resin so that at all times the mixture could be adequately stirred. When sufficient Neocryl XK62 resin had been added so as to give a ratio of Neocryl XK62:CABSU160=75:25 on solids, the mixture was poured from the mixing vessel into a bottle and stored until required.

Preparation of the paint involved adding aluminum flake i.e. Aquavex 516-107P from Silverline Company, which had first been dispersed 1:1 in to butyl glycol (ethylene glycol mono butyl ether) to the above dispersion such that the ratio of resin (acrylic+CABSU160) to aluminum flake was 100:15 on a solids basis. This was mixed with gentle agitation until the mixture was homogeneous. Deionized water was added until the viscosity was 20 sec flow time through Din 4 standard viscosity cup. The paint was filtered through a gauze so as to remove any undispersed aluminum flake or other undispersed species and sprayed onto phosphated steel test panels, using an air pressure of 4 bar (60 psi). The air temperature and humidity was 21° C. and 45% RH. A dry coating thickness of 15 $\mu$m was obtained from 2 spraying applications with air dried (about 17 mins after beginning to apply the first coat) a clear solvent based acrylic/melamine paint was applied so as to produce a glossy appearance. After coating to a thickness of 50 $\mu$m, the panel was heated in an oven at 135° C. for 30 minutes. The paint exhibited excellent metallic appearance with good brightness and flop. A similar paint without the addition of CABSU160 was very mottled, grey in appearance and dried more slowly.

EXAMPLE 2

A composition was prepared as above but with 30 weight percent solids in 2-butanol. This facilitated the dissolving of the CABSU but resulted in increased VOC in the paint. The appearance was unaffected.

EXAMPLE 3

A composition was prepared as above except that the CABSU160 solution may be poured into the (acrylic or acrylic:polyurethane) dispersion in order to produce the CABSU/acrylic blend. The final dispersion appeared identical to that produced with the reverse additional described.

EXAMPLE 4

CABSU1105 (105 acid number) (8 g) powder was slowly poured into a rapidly stirred mixture, using a Silverson High Shear Mixer, of deionized water (140 g) to which 35% ammonia (1.6 g) had been added. The viscosity of the clear solution was further reduced with 120.5 g of deionized water. The dispersion was labelled D54. XPD1162 (solid acrylic resin from BF Goodrich) granules (65.3 g) were slowly poured into a rapidly stirred mixture of deionized water (105 g) to which 35% ammonia (13 g) had been added. The mixing was carried out using a Silverline High Shear Mixer. This dispersion was labelled XPD1162. (35.62%).

To 100 g of D54 dispersion was added 24.92 g of XPD1162 (35.62%) and 6.76 g of AQ504-2075 (aluminum flake from Silverline, diluted 2:1 water to aluminum). This was mixed with gentle agitation. The viscosity of this blend was 15 sec Din 4.

This base coat formulation was filtered through a gauze to remove any undispersed aluminum flake or other undispersed species and sprayed onto phosphated steel panels using an air pressure of 4 bar (60 psi) at a temperature of 21° C. and a humidity level of 55% RH. After two application of base coat, when a dry film thickness of 15 $\mu$m had been achieved, a clear top coat consisting of an acrylic/melamine paint was spray applied to a dry film thickness of 50 $\mu$m. Curing was carried out in an oven at 135° C. for 30 mins. The coating was bright metallic with good flop appearance. The base coat did not contain any volatile organic material. A similar paint which did not contain any CABSU1105 was grey and mottled.

The invention has been described in detail with particular reference to preferred embodiments thereof, but it will be understood that variations and modifications can be effected within the spirit and scope of the invention.

We claim:

1. An aqueous coating composition comprising:
   (a) an amount of 3 to 50 weight percent based on total solids, of at least one cellulose mixed ester having an acid number of at least 50 and having a first ester residue, that is a residue of a dicarboxylic acid anhydride, and a second ester residue that is selected from the group consisting of oleophilic monocarboxylic acid residue, hydrophilic monocarboxylic acid residue, and mixtures thereof; and
   (b) at least 50 weight percent, based on total solids, of a compatible amine neutralized acrylic resin;
   wherein the aqueous coating composition has a near neutral pH and a volatile organics content below 20 weight percent based on the total of solids and liquid.

2. The composition according to claim 1 wherein the volatile organics content is below 15 weight percent based on the total of solids and liquid.

3. The composition according to claim 1 wherein the total solids content is from 5 to 50 weight percent.

4. The composition according to claim 3 wherein the total solids content is from 20 to 40 weight percent.

5. The composition according to claim 1 further comprising up to 30 parts of a metal flake per 100 parts resin mixture of (a+b).

6. The composition according to claim 5 wherein the metal flake is an aluminum flake.

7. The composition according to claim 1 wherein said cellulose mixed ester is selected from succinated derivatives of cellulose esters.

8. The composition according to claim 7 wherein said cellulose mixed ester is selected from cellulose acetate butyrate succinate and cellulose acetate propionate succinate.

9. The composition according to claim 8 wherein the degree of succination of the cellulose ester is at least 10 weight percent and the acid number of the cellulose mixed ester is at least 55.

10. A process of producing an aqueous coating composition comprising:
mixing with a high shear mixer
(a) an amount of 3 to 50 weight percent based on total solids, of at least one cellulose mixed ester having an acid number of at least 50 and having a first ester residue, that is a residue of a dicarboxylic acid anhydride, and a second ester residue that is selected from the group consisting of oleophilic monocarboxylic acid residue, hydrophilic monocarboxylic acid residue, and mixtures thereof; and
(b) at least 50 weight percent, based on total solids, of a compatible amine neutralized acrylic resin to form a composition that has a near neutral pH and a volatile organics content below 20 weight percent based on the total of solids and liquid.

11. The process according to claim 10 wherein the acrylic resin of (b) is neutralized with an amine prior to forming a mixture of (a) and (b).

12. The process according to claim 11 wherein the acrylic resin is neutralized with ammonia.

13. The composition according to claim 1 wherein the second ester residue of the cellulose mixed ester is a mixture of oleophilic monocarboxylic acid residue and hydrophilic monocarboxylic acid residue.

14. The composition according to claim 1 wherein the amount of cellulose mixed ester of (a) is 10 to 30 weight percent based on total solids.

15. The process according to claim 10 wherein the second ester residue of the cellulose mixed ester is a mixture of oleophilic monocarboxylic acid residue and hydrophilic monocarboxylic acid residue.

16. The process according to claim 10 wherein the amount of cellulose mixed ester of (a) is 10 to 30 weight percent based on total solids.

* * * * *